United States Patent
Taira et al.

(10) Patent No.: US 12,491,773 B2
(45) Date of Patent: Dec. 9, 2025

(54) DRIVING FORCE CONTROL METHOD AND DRIVING FORCE CONTROL DEVICE

(71) Applicant: Nissan Motor Co., Ltd., Yokohama (JP)

(72) Inventors: Masahito Taira, Kanagawa (JP); Daisuke Hiroi, Kanagawa (JP); Kentaro Hashimoto, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 376 days.

(21) Appl. No.: 18/032,642

(22) PCT Filed: Oct. 20, 2020

(86) PCT No.: PCT/JP2020/039416
§ 371 (c)(1),
(2) Date: Apr. 19, 2023

(87) PCT Pub. No.: WO2022/085082
PCT Pub. Date: Apr. 28, 2022

(65) Prior Publication Data
US 2023/0391204 A1 Dec. 7, 2023

(51) Int. Cl.
*B60L 15/20* (2006.01)
*B60K 23/08* (2006.01)
*B60L 3/10* (2006.01)

(52) U.S. Cl.
CPC .......... *B60L 15/20* (2013.01); *B60K 23/0808* (2013.01); *B60L 3/10* (2013.01); *B60L 2240/421* (2013.01); *B60Y 2300/188* (2013.01)

(58) Field of Classification Search
CPC ...... B60L 15/20; B60L 3/10; B60L 2240/421; B60K 23/0808; B60Y 2300/188
See application file for complete search history.

(56) References Cited

U.S. PATENT DOCUMENTS

2004/0176899 A1 * 9/2004 Hallowell ........... B60L 15/2036
701/84
2021/0188278 A1 * 6/2021 Oguro ............. B60W 30/18172

FOREIGN PATENT DOCUMENTS

| JP | 2006-246607 A | 9/2006 |
| JP | 2007306679 A | 11/2007 |
| JP | 5835583 B | * 12/2015 |
| JP | 5835583 B2 | 12/2015 |

* cited by examiner

*Primary Examiner* — Anil K Bhargava
(74) *Attorney, Agent, or Firm* — Young Basile Hanlon & MacFarlane, P.C.

(57) ABSTRACT

A driving force control method is executed in a vehicle including first and second electric motors, and distributes a requested driving force for driving at a predetermined distribution ratio according to a traveling state and outputs the requested driving force by the first and second electric motors. The method includes: transferring an output torque from one electric motor to the other in response to a change in the distribution ratio based on the traveling state; setting a slip state parameter indicating a slip state; when the slip state parameter is equal to or smaller than a predetermined threshold value, setting an upper limit of a change speed of the output torque to be transferred to a first upper limit value that is small; and when the slip state parameter exceeds the threshold value, setting the upper limit of the change speed to a second upper limit value that is large.

4 Claims, 7 Drawing Sheets

DRIVING FORCE CONTROL METHOD AND DRIVING FORCE CONTROL DEVICE

TECHNICAL FIELD

The present invention relates to a driving force control method and a driving force control device.

BACKGROUND

JP5835583B proposes a driving force control method for a four-wheel drive electric vehicle in which front wheels can be driven by a first electric motor and rear wheels can be driven by a second electric motor in the electric vehicle using the electric motors as a traveling driving source.

In the driving force control method, a slip state of the front wheels and the rear wheels is detected based on a difference in rotation speed between the front wheels and the rear wheels, an output torque of each of the first electric motor and the second electric motor is changed based on the slip state, and the output torque is transferred from a slipping wheel to a non-slipping wheel of the front wheels and the rear wheels. When the output torque is transferred, a change speed in transfer amount of the output torque is limited to be equal to or smaller than a first predetermined value at which the non-slipping wheel does not slip.

SUMMARY

The present inventors have found that in the driving force control method described in JP5835583B, during communication between a control device and an inverter of each of the first electric motor and the second electric motor, the first electric motor and the second electric motor are different in control responsiveness due to a factor such as deviation of phases of signals transmitted to the respective inverters.

Therefore, responsiveness of an actual torque to a torque command value in the first electric motor is different from responsiveness of an actual torque to a torque command value in the second electric motor, a total requested driving force for the vehicle is temporarily not satisfied during transferring of the output torque, and a change in longitudinal G that makes an occupant feel uncomfortable occurs.

Therefore, an object of the present invention is to provide a driving force control method and a driving force control device capable of suppressing a change in longitudinal G during transferring of an output torque.

A driving force control method that is executed in a vehicle including a first electric motor configured to drive a front wheel and a second electric motor configured to drive a rear wheel, and that distributes a requested driving force for traveling driving at a predetermined distribution ratio according to a traveling state of the vehicle and outputs the requested driving force by the first electric motor and the second electric motor, is provided. The driving force control method includes: transferring an output torque from one electric motor to the other electric motor in response to a change in the distribution ratio based on the traveling state of the vehicle; setting a slip state parameter indicating a slip state of the vehicle; when the slip state parameter is equal to or smaller than a predetermined threshold value, setting an upper limit of a change speed of the output torque to be transferred to a first upper limit value that is relatively small; and when the slip state parameter exceeds the threshold value, setting the upper limit of the change speed to a second upper limit value that is relatively large.

DETAILED DESCRIPTION

Hereinafter, embodiments of the present invention will be described in detail with reference to drawings.

First Embodiment

Hereinafter, a first embodiment will be described.

Figure 1:
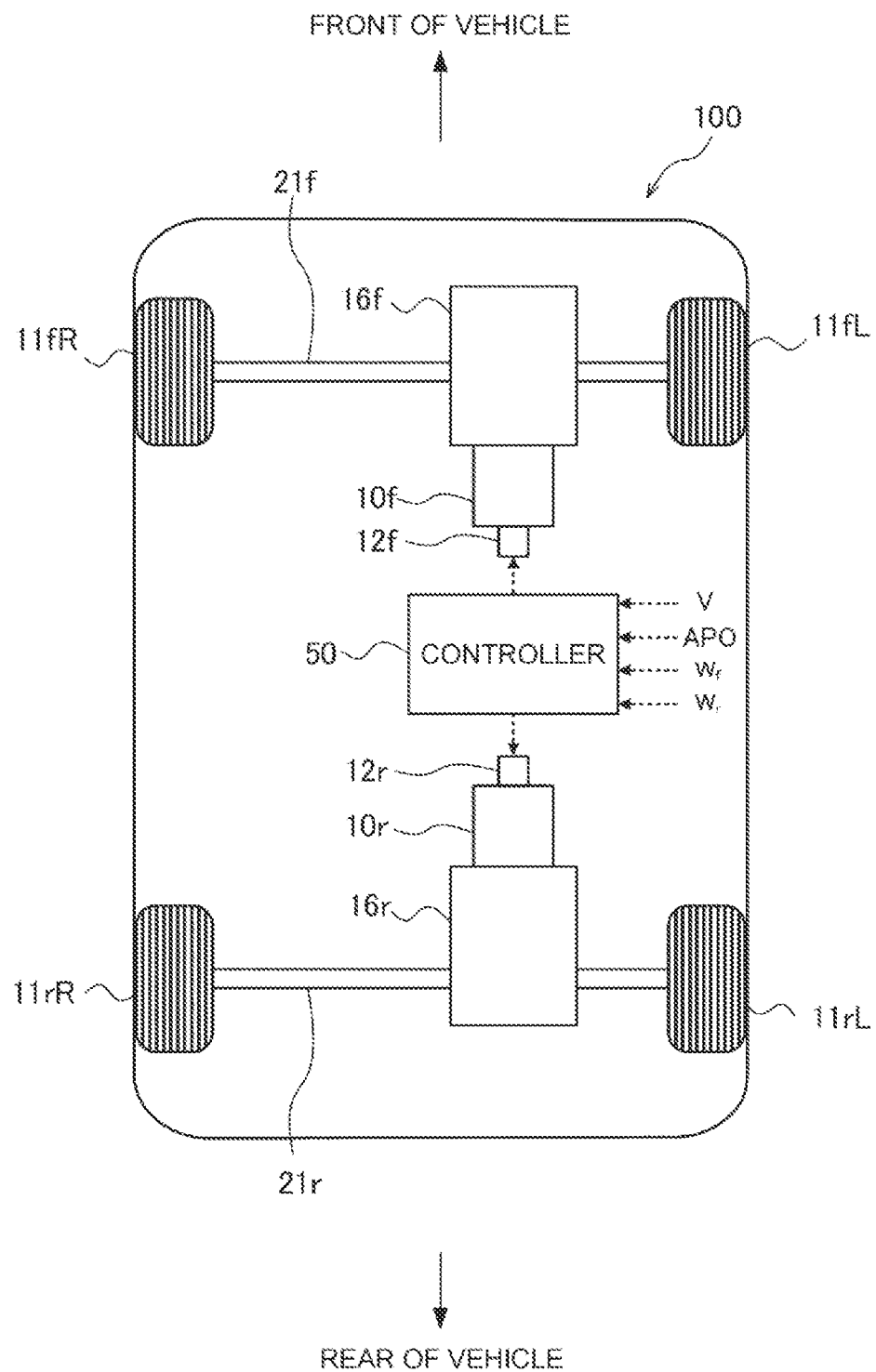
FIG. 1 is a diagram illustrating a configuration of a vehicle in which a driving force control method according to an embodiment of the present invention is executed.

FIG. 1 is a diagram illustrating a configuration of a vehicle 100 in which a driving force control method according to the present embodiment is executed.

As the vehicle 100 in the present embodiment, an electric vehicle, a hybrid vehicle, or the like, which includes a drive motor 10 serving as a driving source and can travel by a driving force of the drive motor 10, is assumed.

The vehicle 100 is provided, at a forward position (hereinafter, referred to as a "front wheel side"), with a front motor 10f serving as a first electric motor that drives front wheels 11f, and is provided, at a rearward position (hereinafter, referred to as a "rear wheel side"), with a rear motor 10r serving as a second electric motor that drives rear wheels 11r. In particular, the vehicle 100 in the present embodiment has a configuration in which a drive system on the front wheel side and a drive system on the rear wheel side are mechanically independent from each other.

The front motor 10f is implemented by a three-phase alternating-current motor. The front motor 10f generates a driving force by being supplied with power from a battery 15 serving as a power source. The driving force generated by the front motor 10f is transmitted to the front wheels 11f via a front transmission 16f and a front drive shaft 21f. The front motor 10f converts, into alternating-current power, a regenerative driving force generated when the front motor 10f rotates together with the front wheels 11f during traveling of the vehicle 100. The power supplied to the front motor 10f is adjusted by a front inverter 12f. In particular, the front inverter 12f adjusts the driving force generated by the front motor 10f based on a final command value of a front torque $T_{fm}$ (hereinafter, also referred to as a "final front torque command value $T^{**}_{fm}$").

On the other hand, the rear motor 10r is implemented by a three-phase alternating-current motor. The rear motor 10r generates a driving force by being supplied with power from the battery 15 serving as the power source. The driving force generated by the rear motor 10r is transmitted to the rear wheels 11r via a rear transmission 16r and a rear drive shaft 21r. The rear motor 10r converts, into alternating-current power, a regenerative driving force generated when the rear motor 10r rotates together with the rear wheels 11r during the traveling of the vehicle 100. The power supplied to the rear motor 10r is adjusted by a rear inverter 12r. In particular, the rear inverter 12r adjusts the driving force generated by the rear motor 10r based on a final command value of a rear torque $T_{mr}$ (hereinafter, also referred to as a "final rear torque command value $T^{**}_{mr}$").

Furthermore, the vehicle 100 is provided with a controller 50 serving as a driving force control device that controls an output torque of the front motor 10f (hereinafter, also referred to as the "front torque $T_{fm}$") and an output torque of the rear motor 10r (hereinafter, also referred to as the "rear torque $T_{mr}$").

The controller 50 is implemented by a computer including a central processing unit (CPU) (e.g., a processor), a read-only memory (ROM), a random access memory (RAM), and an input/output interface (I/O interface), and is programmed to execute processes in vehicle control to be described below. In particular, a function of the controller 50 can be implemented by any of in-vehicle computers such as a vehicle control module (VCM), a vehicle motion controller (VMC), and a motor controller, and/or a computer provided outside the vehicle 100. The controller 50 may be implemented by one piece of computer hardware, or may be implemented by distributing various processes by a plurality of pieces of computer hardware.

In particular, the controller 50 acquires, as input information, a vehicle speed V, an accelerator position APO, a rotation speed of the front wheels 11f (hereinafter, also referred to as a "front wheel speed $w_f$") determined according to a rotation speed of the front motor 10f, and a rotation speed of the rear wheels 11r (hereinafter, also referred to as a "rear wheel speed $w_r$") determined according to a rotation speed of the rear motor 10r. The controller 50 calculates the final front torque command value $T^{}_{fm}$ and the final rear torque command value $T^{}_{mr}$ based on these pieces of input information, and outputs the final front torque command value $T^{}_{fm}$ and the final rear torque command value $T^{}_{mr}$ to the front inverter 12f and the rear inverter 12r, respectively.

The vehicle speed V which is the input information may be acquired, for example, as a detection value of a vehicle speed sensor (not shown), or may be estimated from at least one of the front wheel speed $w_f$ and the rear wheel speed $w_r$. The accelerator position APO may be acquired, for example, as a detection value of an accelerator position sensor (not shown). The accelerator position APO corresponds to an operation amount of an accelerator pedal by a driver of the vehicle 100. When the vehicle 100 is equipped with a so-called automatic driving function, as the accelerator position APO, an operation amount of the accelerator pedal according to a command from an automatic driving controller or any other parameter indicating a magnitude of a requested driving force can be used. Furthermore, each of the front wheel speed $w_f$ and the rear wheel speed $w_r$ may be acquired, for example, as a detection value of a rotation speed sensor (not shown). Hereinafter, details of driving force control executed by the controller 50 will be described.

Figure 2:
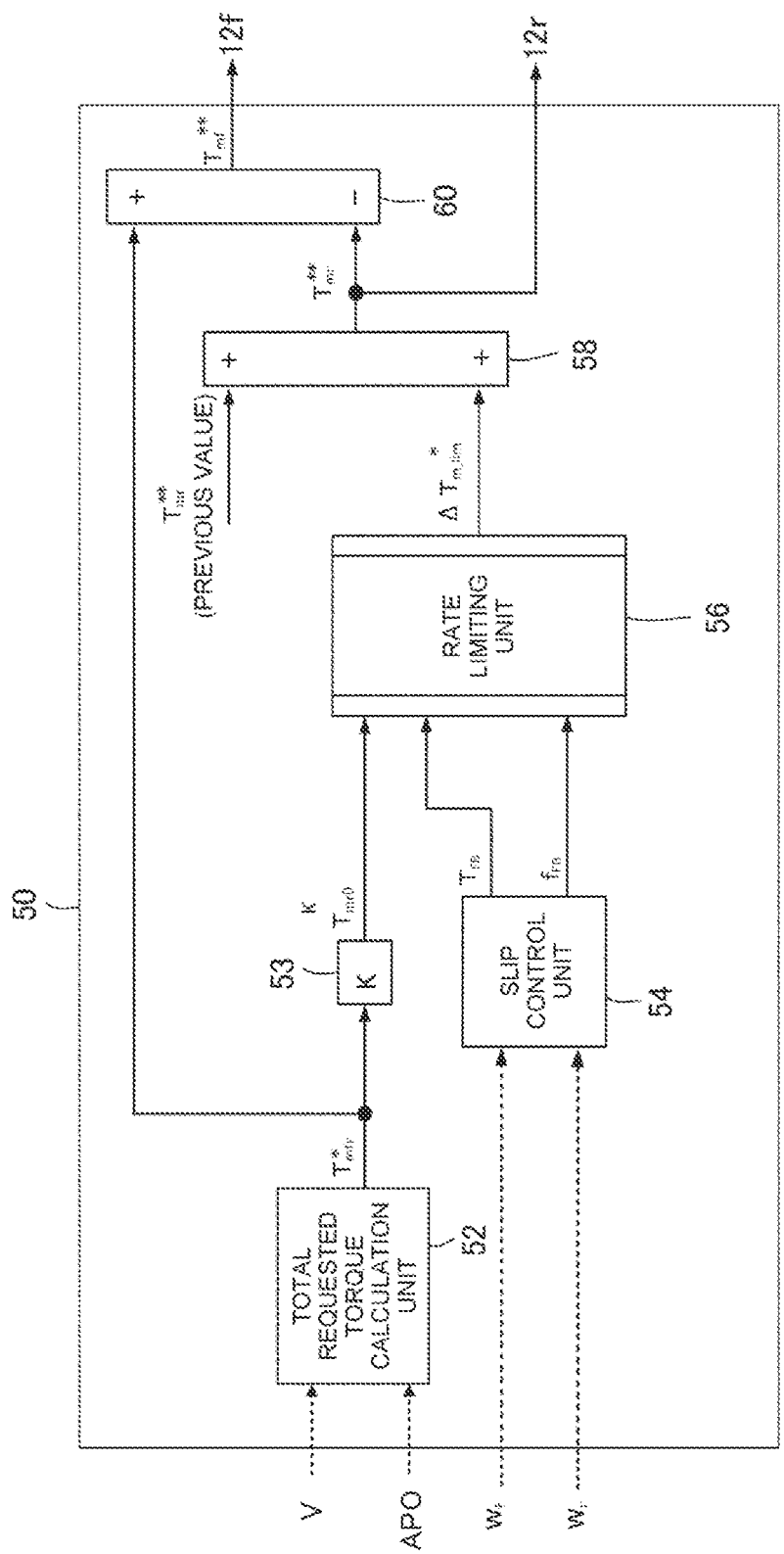
FIG. 2 is a block diagram illustrating a configuration of a driving force control device according to a first embodiment.

FIG. 2 is a block diagram illustrating a configuration of the controller 50. As illustrated, the controller 50 includes a total requested torque calculation unit 52, a torque distribution unit 53, a slip control unit 54, a rate limiting unit 56, an addition unit 58, and a subtraction unit 60.

The total requested torque calculation unit 52 calculates, based on the vehicle speed V and the accelerator position APO, a total torque corresponding to a total driving force requested by the vehicle 100, that is, a total requested torque $T^*_{mfr}$ which is a sum of torques requested by both the front motor 10f and the rear motor 10r that serve as the driving source.

In particular, in the present embodiment, the total requested torque $T^*_{mfr}$ corresponds to a target value of a total driving force of a driving force to be output by the front wheels 11f and a driving force to be output by the rear wheels 11r. For example, the total requested torque calculation unit 52 can calculate the total requested torque $T^*_{mfr}$ by reading, from any memory, a predetermined map that determines the suitable total requested torque $T^*_{mfr}$ for the accelerator position APO and the vehicle speed V, and applying the current vehicle speed V and the current accelerator position APO to the map. Then, the total requested torque calculation unit 52 outputs the calculated total requested torque $T^*_{mfr}$ to the torque distribution unit 53 and the subtraction unit 60.

The torque distribution unit 53 receives, as an input, the total requested torque $T^*_{mfr}$ from the total requested torque calculation unit 52, and calculates a basic rear torque command value $T_{mr0}$. Specifically, the torque distribution unit 53 obtains the basic rear torque command value $T_{mr0}$ by multiplying the total requested torque $T^*_{mfr}$ by a distribution ratio κ. Here, the distribution ratio κ is a basic target value of a ratio of the rear torque $T_{mr}$ to the front torque $T_{fm}$. The distribution ratio κ is set to an appropriate value according to a traveling state of the vehicle 100. The traveling state of the vehicle 100 for determining the distribution ratio κ includes a traveling mode set for the vehicle 100 (a traveling mode in which traveling stability is emphasized, a traveling mode in which energy efficiency is prioritized, or the like), transition of a position of a center of gravity of the vehicle 100, and the like. For example, the distribution ratio κ can be obtained in advance by an experiment, a simulation, or the like, and can be obtained by using a map that determines an appropriate value according to a parameter (the total requested torque $T^*_{mfr}$, the vehicle speed V, or the like) indicating the traveling state of the vehicle 100. Then, the torque distribution unit 53 outputs the calculated basic rear torque command value $T_{mr0}$ to the rate limiting unit 56.

The slip control unit 54 receives the front wheel speed $w_f$ and the rear wheel speed $w_r$ as an input, sets a slip control intervention flag $f_{FB}$, and calculates a feedback correction torque $T_{FB}$.

Specifically, the slip control unit 54 calculates the feedback correction torque $T_{FB}$ such that a difference between the front wheel speed $w_f$ and the rear wheel speed $w_r$ (hereinafter, also referred to as a "front-rear wheel speed difference $\Delta w_{mfr}$") is equal to or smaller than a predetermined front-rear wheel speed difference threshold value $\Delta w_{mfr\_Th}$. The front-rear wheel speed difference threshold value $\Delta w_{mfr\_Th}$ is determined as a value of a difference between the front wheel speed $w_f$ and the rear wheel speed $w_r$, which is a criterion for estimating a slip state of the vehicle 100 (a state where slipping of the front wheels 11f or the rear wheels 11r occurs).

Furthermore, when the front-rear wheel speed difference $\Delta w_{mfr}$ exceeds the front-rear wheel speed difference threshold value $\Delta w_{mfr\_Th}$ (that is, when the calculated feedback correction torque $T_{FB}$ is not substantially 0), the slip control unit 54 sets the slip control intervention flag $f_{FB}$ to "1". On the other hand, when the front-rear wheel speed difference $\Delta w_{mfr}$ is equal to or smaller than the front-rear wheel speed difference threshold value $\Delta w_{mfr\_Th}$ (that is, when the calculated feedback correction torque $T_{FB}$ is substantially 0), the slip control unit 54 sets the slip control intervention flag $f_{FB}$ to "0".

That is, in the present embodiment, a case where the slip control intervention flag $f_{FB}$ is set to "1" corresponds to a case where the vehicle 100 is in the slip state (a state where the front wheels 11f or the rear wheels 11r slip). On the other hand, a case where the slip control intervention flag $f_{FB}$ is set to "0" corresponds to a case where the vehicle 100 is in a non-slip state (a state where none of the front wheels 11f and the rear wheels 11r slip). Then, the slip control unit 54 outputs the calculated feedback correction torque $T_{FB}$ and the set slip control intervention flag $f_{FB}$ to the rate limiting unit 56.

The rate limiting unit 56 receives, as an input, the distribution ratio κ and the basic rear torque command value $T_{mr0}$ from the torque distribution unit 53, and the feedback correction torque $T_{FB}$ and the slip control intervention flag $f_{FB}$ from the slip control unit 54, and calculates a limited transferred torque amount $\Delta T^{**}_{m\_lim}$. Hereinafter, details of a process in the rate limiting unit 56 will be described.

Figure 3:
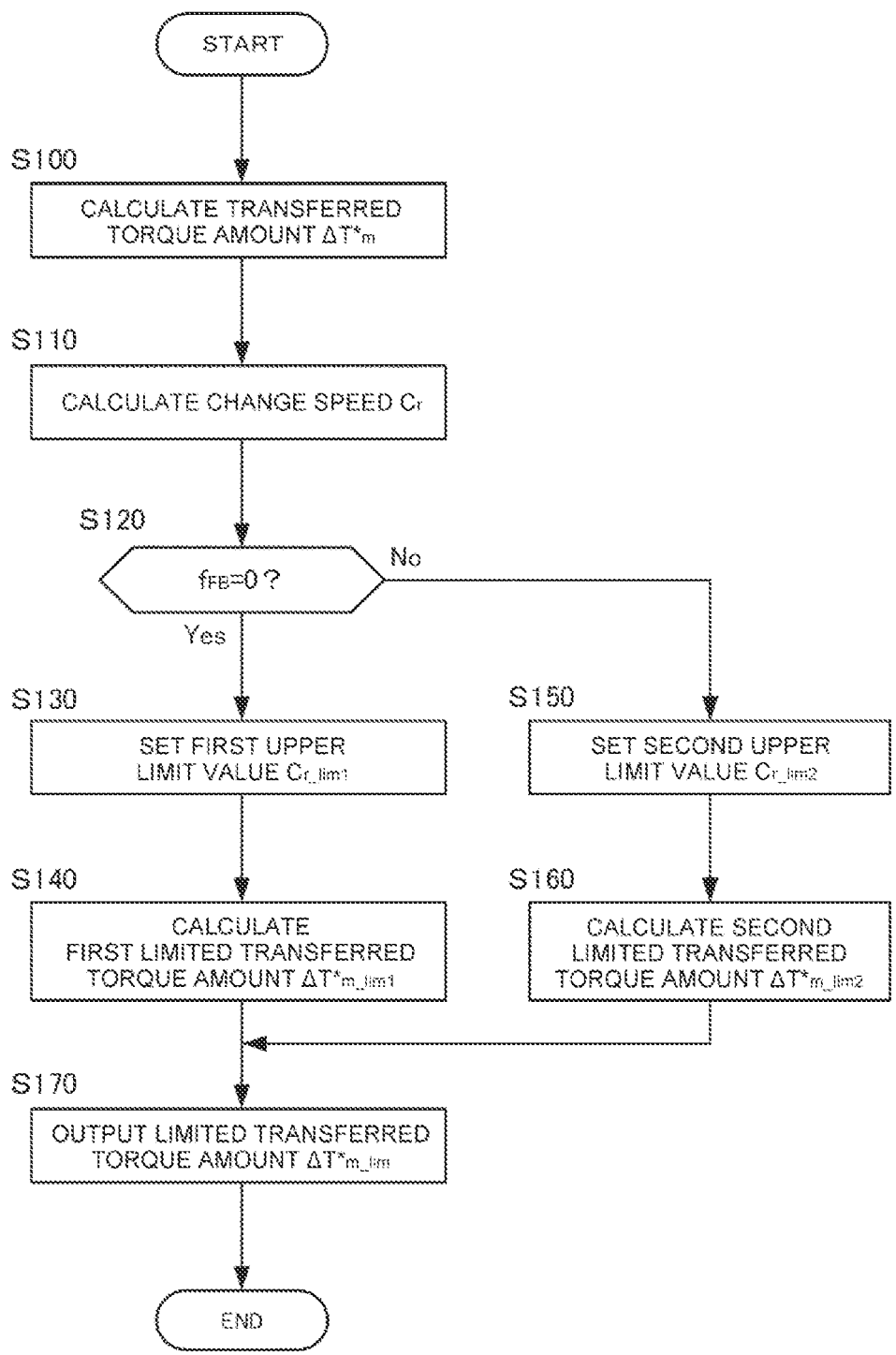
FIG. 3 is a flowchart showing a process in a rate limiting unit.

FIG. 3 is a flowchart showing the process in the rate limiting unit 56. A routine shown in the flowchart is repeatedly executed by the controller 50, for example, every predetermined calculation period by using power-on of the vehicle 100 as a trigger.

In step S100, the rate limiting unit 56 calculates a transferred torque amount $\Delta T^*_m$. Here, the transferred torque amount $\Delta T^*_m$ is a value corresponding to an output torque that is transferred from the rear wheels 11r to the front wheels 11f according to the distribution ratio κ and the feedback correction torque $T_{FB}$. In particular, the transferred torque amount $\Delta T^*_m$ is a positive value when a positive torque is transferred from the front motor 10f to the rear motor 10r, and is a negative value when a positive torque is transferred from the rear motor 10r to the front motor 10f.

Specifically, first, the rate limiting unit 56 calculates a corrected rear torque $T^*_{mr}$ by using a sum of the basic rear torque command value $T_{mr0}$ and a value obtained by multiplying the feedback correction torque $T_{FB}$ by the distribution ratio κ (corresponding to a distribution amount of the feedback correction torque $T_{FB}$ to the rear motor 10r). That is, the corrected rear torque $T^*_{mr}$ is a value obtained by correcting the basic rear torque command value $T_{mr0}$ in consideration of the slip state of the vehicle 100. Then, the rate limiting unit 56 obtains, as the transferred torque amount $\Delta T^*_m$, a value obtained by subtracting a previous value from a current value of the corrected rear torque $T^*_{mr}$.

Next, in step S110, the rate limiting unit 56 calculates a change speed $C_r$ of the transferred torque amount $\Delta T^*_m$. Specifically, the rate limiting unit 56 obtains, as the change speed $C_r$, a value obtained by dividing the transferred torque amount $\Delta T^*_m$ by the calculation period.

In step S120, the rate limiting unit 56 determines whether the slip control intervention flag $f_{FB}$ is set to "0" (whether the vehicle 100 is in the non-slip state). When the rate limiting unit 56 determines that the slip control intervention flag $f_{FB}$ is set to "0", the rate limiting unit 56 executes a process of step S130 and subsequent processes.

In step S130, the rate limiting unit 56 sets a first upper limit value $C_{r\_lim1}$ as an upper limit value of the change speed $C_r$. Here, the first upper limit value $C_{r\_lim1}$ is the upper limit value of the change speed $C_r$ which is determined from a viewpoint of suppressing a delay in torque control caused by a difference in responsiveness of communication (CAN communication) between one controller 50 and each of the front inverter 12f and the rear inverter 12r when the vehicle 100 is in the non-slip state.

Furthermore, in step S140, the rate limiting unit 56 calculates a first limited transferred torque amount $\Delta T^*_{m\_lim1}$ based on the change speed $C_r$ calculated in step S110 and the first upper limit value $C_{r\_lim1}$ calculated in step S130. Specifically, the rate limiting unit 56 calculates the first limited transferred torque amount $\Delta T^*_{m\_lim1}$ by selecting the smaller one of the change speed $C_r$ and the first upper limit value $C_{r\_lim1}$ and adding a previous value of the transferred torque amount $\Delta T^*_m$ to the selected value.

On the other hand, when the rate limiting unit 56 determines in step S120 that the slip control intervention flag $f_{FB}$ is not set to "0" (that is, set to "1"), the rate limiting unit 56 executes a process of step S150 and subsequent processes.

In step S150, the rate limiting unit 56 sets a second upper limit value $C_{r\_lim2}$ as the upper limit value of the change speed $C_r$. Here, the second upper limit value $C_{r\_lim2}$ is the upper limit value of the change speed $C_r$ which is determined from a viewpoint of suppressing a sudden change in the transferred torque amount $\Delta T^*_m$ when the vehicle 100 is in the slip state. On the other hand, the second upper limit value $C_{r\_lim2}$ in the present embodiment is set to a value larger than the first upper limit value $C_{r\_lim1}$ set during non-occurrence of slipping, from a viewpoint of eliminating the slip state of the vehicle 100 as quickly as possible.

Furthermore, in step S160, the rate limiting unit 56 calculates a second limited transferred torque amount $\Delta T^*_{m\_lim2}$ based on the change speed $C_r$ calculated in step S110 and the second upper limit value $C_{r\_lim2}$ calculated in step S150. Specifically, the rate limiting unit 56 calculates the second limited transferred torque amount $\Delta T^*_{m\_lim2}$ by selecting the smaller one of the current change speed $C_r$ and the second upper limit value $C_{r\_lim2}$ and adding the previous value of the transferred torque amount $\Delta T^*_m$ to the selected value.

Then, in step S170, the rate limiting unit 56 outputs the limited transferred torque amount $\Delta T^*_{m\_lim}$ to the addition unit 58. In particular, the rate limiting unit 56 outputs the first limited transferred torque amount $\Delta T^*_{m\_lim1}$ as the limited transferred torque amount $\Delta T^*_{m\_lim}$ when the slip control intervention flag $f_{FB}$ is set to "0", and outputs the second limited transferred torque amount $\Delta T^*_{m\_lim2}$ as the limited transferred torque amount $\Delta T^*_{m\_lim}$ when the slip control intervention flag $f_{FB}$ is set to "1".

Referring back to FIG. 2, the addition unit 58 receives a previous value of the final rear torque command value $T^{**}_{mr}$ and the limited transferred torque amount $\Delta T^*_{m\_lim}$ from the rate limiting unit 56 as an input, and calculates the final rear torque command value $T^{}_{mr}$. Specifically, the addition unit 58 obtains the final rear torque command value $T^{}_{mr}$ by adding the limited transferred torque amount $\Delta T^*_{m\_lim}$ to the previous value of the final rear torque command value $T^{}_{mr}$. As a result, the final rear torque command value $T^{}_{mr}$ whose change speed is adjusted according to whether the slipping occurs is obtained. Then, the addition unit 58 outputs the calculated final rear torque command value $T^{**}_{mr}$ to the rear inverter 12r and the subtraction unit 60.

The subtraction unit 60 receives, as an input, the total requested torque $T^*_{mfr}$ from the total requested torque calculation unit 52 and the final rear torque command value $T^{}_{mr}$ from the addition unit 58, and calculates the final front torque command value $T^{}_{fm}$. As a result, the final front torque command value $T^{}_{fm}$ whose change speed is adjusted in the same manner as the final rear torque command value $T^{}_{mr}$ is obtained. Then, the subtraction unit 60 outputs the calculated final front torque command value T**$_{fm}$ to the front inverter 12$f$.

Next, the upper limit of the change speed C$_r$ of the transferred torque amount ΔT*$_m$ set in the present embodiment will be described in more detail.

Figure 4:
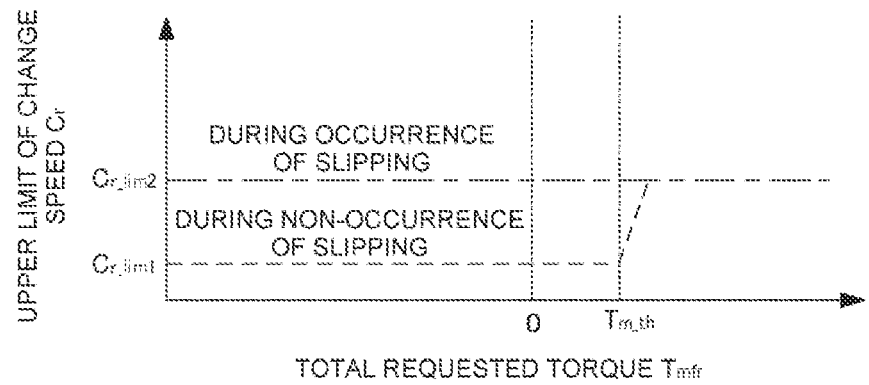
FIG. 4 is a time chart showing a temporal change in limited rear torque change amount.

FIG. 4 is a time chart showing a temporal change in the upper limit of the change speed C$_r$ of the transferred torque amount ΔT*$_m$. As illustrated, in the present embodiment, the upper limit of the change speed C$_r$ of the transferred torque amount ΔT*$_m$ during occurrence of the slipping is set to the second upper limit value C$_{r\_lim2}$ that is relatively large, and the upper limit of the change speed C$_r$ of the transferred torque amount ΔT*$_m$ during non-occurrence of the slipping is set to the first upper limit value C$_{r\_lim1}$ that is relatively small. In particular, in the present embodiment, the second upper limit value C$_{r\_lim2}$ is a substantially constant value regardless of a magnitude of the total requested torque T*$_{mfr}$. On the other hand, the first upper limit value C$_{r\_lim1}$ is a constant value which is smaller than the second upper limit value C$_{r\_lim2}$ in a region where the total requested torque T*$_{mfr}$ is equal to or smaller than a predetermined torque threshold value T$_{mfr\_th}$ determined as a criterion for determining whether the torque is in a low torque range.

As a result, in a scene in which the slipping of the front wheels 11$f$ or the rear wheels 11$r$ occurs in the low torque range such as during deceleration of the vehicle 100 or during starting of the vehicle 100 on a low μ road, the second upper limit value C$_{r\_lim2}$ that is relatively large is set as the upper limit of the change speed C$_r$, so that it is possible to maintain responsiveness of the torque control in a relatively high state and to quickly eliminate the occurring slipping.

On the other hand, in a scene in which the slipping does not occur even in the low torque range, the upper limit of the change speed C$_r$ is limited by the first upper limit value C$_{r\_lim1}$ that is relatively small. As a result, it is possible to suppress the delay in torque control caused by the difference in responsiveness of communication between the controller 50 and each of the front and rear inverters described above. More specifically, due to the difference in responsiveness of communication, followability to a command value in torque control related to the front motor 10$f$ is different from followability to a command value in torque control related to the rear motor 10$r$, and a situation may temporarily occur in which an actual total torque T$_{mfr}$ cannot satisfy the total requested torque T*$_{mfr}$. In such a situation, by limiting the upper limit of the change speed C$_r$ to the first upper limit value C$_{r\_lim1}$, it is possible to improve followability of the actual total torque T$_{mfr}$ to the total requested torque T*$_{mfr}$.

Furthermore, the first upper limit value C$_{r\_lim1}$ in the present embodiment is determined such that, in a region where the total requested torque T*$_{mfr}$ exceeds the torque threshold value T$_{mfr\_th}$, as the total requested torque T*$_{mfr}$ increases, the first upper limit value C$_{r\_lim1}$ increases to approach the second upper limit value C$_{r\_lim2}$. Therefore, in intermediate and high torque ranges in which an influence on the torque control due to the difference in responsiveness of communication is considered to be small, by allowing the first upper limit value C$_{r\_lim1}$ to approach the second upper limit value C$_{r\_lim2}$, it is possible to suppress a decrease in control responsiveness due to limitation of the upper limit of the change speed C$_r$ of the transferred torque amount ΔT*$_m$ by the first upper limit value C$_{r\_lim1}$.

Figure 5A:
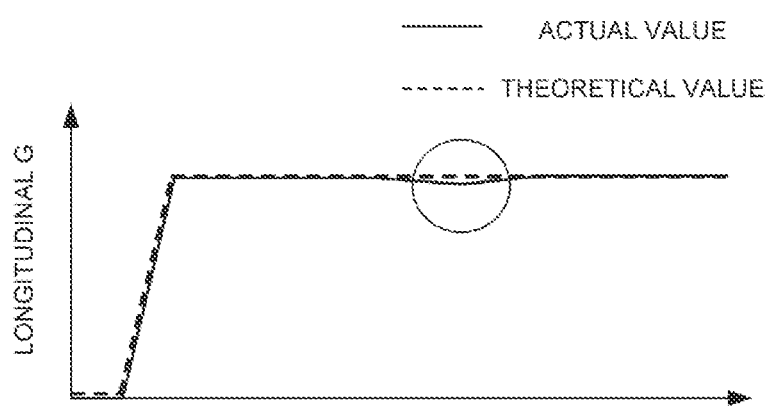
FIGS. 5A and 5B are diagrams illustrating a control result obtained by the driving force control method according to the present embodiment.
Figure 5B:
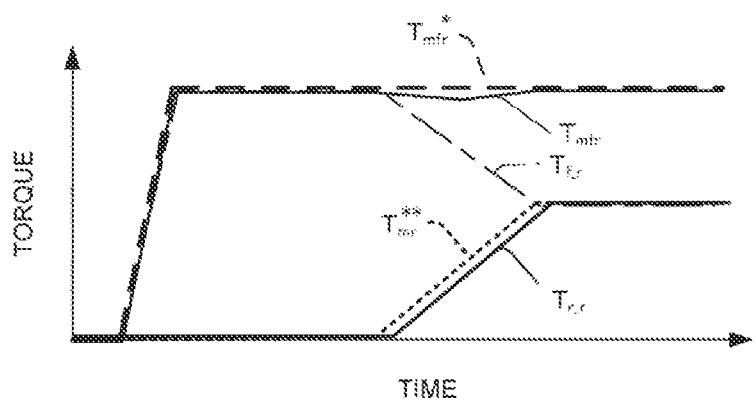
Figure 6A:
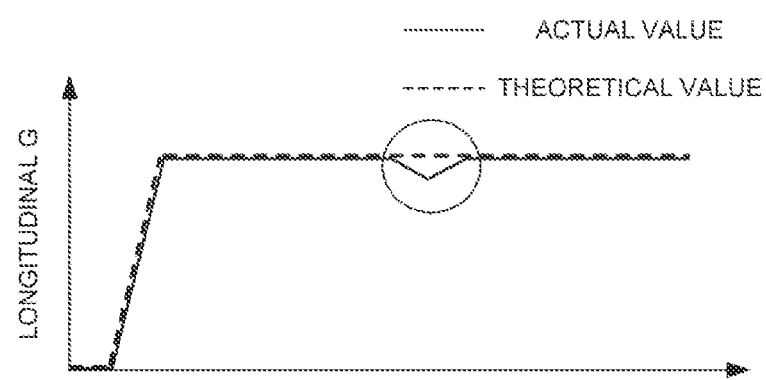
FIGS. 6A and 6B are diagrams illustrating a control result of a comparative example.
Figure 6B:
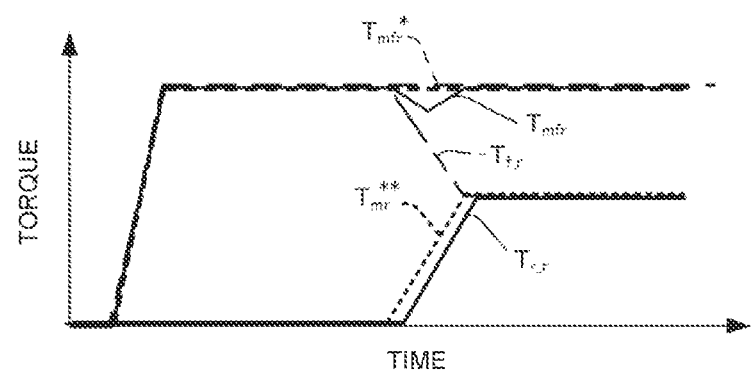

FIGS. 5A and 5B are diagrams illustrating a control result obtained by the driving force control method according to the present embodiment. FIGS. 6A and 6B show, as a comparative example, a control result when the driving force control method according to the present embodiment is not executed. In FIGS. 5A, 5B, 6A and 6B, a scene is assumed in which the output torque is transferred from the front wheels 11$f$ to the rear wheels 11$r$ by the slipping of the rear wheels 11$r$ in the low torque range such as during the starting on the low μ road (that is, the transferred torque amount ΔT*$_m$>0). In particular, in FIGS. 5A, 5B, 6A and 6B, a situation is assumed in which the rear inverter 12$r$ has lower responsiveness of communication to a command signal of the controller 50 than the front inverter 12$f$.

Control in the comparative example shown in FIGS. 6A and 6B is different from the driving force control method according to the present embodiment in that the upper limit of the change speed C$_r$ of the transferred torque amount ΔT*$_m$ is always set to the second upper limit value C$_{r\_lim2}$. In such a control in the comparative example, as can be seen from FIG. 6B, due to the difference in responsiveness of communication between the front wheel side and the rear wheel side described above, followability of an actual rear torque T$_{r\_r}$ to the final rear torque command value T$_{mr}$ is lower than followability of an actual front torque T$_{f\_r}$ to the final front torque command value T$_{fm}$. Therefore, when the change speed C$_r$ of the transferred torque amount ΔT*$_m$ (a slope of a graph of the final rear torque command value T**$_{mr}$) increases, a change of the actual rear torque T$_{r\_r}$ is delayed with respect to a change of the actual front torque T$_{f\_r}$. As a result, during transferring of the torque, the actual total torque T$_{mfr}$ cannot follow the total requested torque T*$_{mfr}$, and a level difference in longitudinal G that makes an occupant of the vehicle 100 feel uncomfortable occurs (see a circled portion in FIG. 6A).

In contrast, in control in the present embodiment shown in FIGS. 5A and 5B, the upper limit of the change speed C$_r$ of the transferred torque amount ΔT*$_m$ is limited to the first upper limit value C$_{r\_lim1}$ smaller than the second upper limit value C$_{r\_lim2}$. Therefore, a difference in followability to the command value between the actual rear torque T$_{r\_r}$ and the actual front torque T$_{f\_r}$ can be reduced (see FIG. 5B). As a result, occurrence of the level difference in longitudinal G during the transferring of the torque is suppressed (see FIG. 5A).

Hereinafter, effects achieved by the configuration of the present embodiment described above will be described in more detail.

In the present embodiment, there is provided the driving force control method that is executed in the vehicle 100 and that distributes a requested driving force for traveling driving (total requested torque T*$_{mfr}$) at a predetermined distribution ratio (distribution ratio κ) according to the traveling state of the vehicle 100 and outputs the requested driving force by the front motor 10$f$ and the rear motor 10$r$, and the vehicle 100 includes the front motor 10$f$ serving as the first electric motor that drives the front wheels 11$f$, and the rear motor 10$r$ serving as the second electric motor that drives the rear wheels 11$r$.

In the driving force control method, in response to a change in the distribution ratio γ based on the traveling state of the vehicle 100, the output torque is transferred from the rear motor 10$r$ serving as one electric motor to the front motor 10$f$ serving as the other electric motor, and a slip state parameter (front-rear wheel speed difference Δw$_{mfr}$ or slip control intervention flag f$_{FB}$) indicating the slip state of the vehicle 100 is set.

When the slip state parameter is equal to or smaller than a predetermined threshold value (when the slip control intervention flag f$_{FB}$="0"), the upper limit of the change speed C$_r$ of the output torque (transferred torque amount ΔT*$_m$) to be transferred is set to the first upper limit value $C_{r\_lim1}$ that is relatively small. When the slip state parameter exceeds the threshold value (when the slip control intervention flag $f_{FB}$="1"), the upper limit of the change speed $C_r$ of the transferred torque amount $\Delta T^*_m$ is set to the second upper limit value $C_{r\_lim2}$ that is relatively large.

As a result, in a scene in which an actual driving force deviates from the total requested torque $T^*_{mfr}$ due to the difference in responsiveness of communication between the front and rear drive systems of the vehicle 100, the change speed $C_r$ of the transferred torque amount $\Delta T^*_m$ can be slowed down. Therefore, it is possible to suppress a change in longitudinal G caused by a phenomenon that the actual driving force (actual total torque $T_{mfr}$) cannot follow a total requested driving force (total requested torque $T^*_{mfr}$).

In particular, in the present embodiment, as the total requested torque $T^*_{mfr}$ increases, the first upper limit value $C_{r\_lim1}$ is set to be larger.

As a result, as the requested driving force for the vehicle 100 increases, a limitation on the change speed $C_r$ of the transferred torque amount $\Delta T^*_m$ in consideration of the difference in responsiveness of communication between the front and rear drive systems is relaxed. Therefore, in a scene in which the influence on the torque control due to the difference in responsiveness of communication is considered to be small, the responsiveness of the torque control can be suitably ensured.

When the total requested torque $T^*_{mfr}$ is equal to or smaller than a predetermined driving force threshold value (torque threshold value $T_{mfr\_th}$), the first upper limit value $C_{r\_lim1}$ is set to a constant value with respect to a change in the total requested torque $T^*_{mfr}$. On the other hand, when the total requested torque $T^*_{mfr}$ exceeds the torque threshold value $T_{mfr\_th}$, the first upper limit value $C_{r\_lim1}$ is set to a variation value that increases with an increase in the total requested torque $T^*_{mfr}$. In particular, the torque threshold value $T_{mfr\_th}$ is determined from a viewpoint of determining a starting scene of the vehicle 100.

As a result, it is possible to set suitable responsiveness of the torque control in accordance with a magnitude of the requested driving force for the vehicle 100.

Furthermore, in the present embodiment, the slip state parameter includes the front-rear wheel speed difference $\Delta w_{mfr}$ which is a difference in rotation speed between the front wheels 11f and the rear wheels 11r, and a predetermined speed difference threshold value (front-rear wheel speed difference threshold value $\Delta w_{mfr\_Th}$) is set as the threshold value of the slip state parameter. The output torque to be transferred from a slipping wheel to a non-slipping wheel of the front wheels 11f and the rear wheels 11r is corrected (the transferred torque amount $\Delta T^*_m$ is corrected to obtain the corrected rear torque $T^*_m$) such that the front-rear wheel speed difference $\Delta w_{mfr}$ approaches the front-rear wheel speed difference threshold value $\Delta w_{mfr\_Th}$.

As a result, it is possible to more appropriately determine the actual slip state of the vehicle 100 based on the front-rear wheel speed difference $\Delta w_{mfr}$ which is a specific index indicating whether the slipping occurs in the front wheels 11f or the rear wheels 11r, so that the upper limit of the change speed $C_r$ can be more appropriately set to the first upper limit value $C_{r\_lim1}$ or the second upper limit value $C_{r\_lim2}$ according to the scene.

In the present embodiment, the final rear torque command value $T^{**}_{mr}$, which is a torque command value of the rear motor 10r determined by limiting, by the first upper limit value $C_{r\_lim1}$ or the second upper limit value $C_{r\_lim2}$, the transferred torque amount $\Delta T^*_m$, is calculated. The final front torque command value $T^{}_{fm}$ which is a torque command value of the front motor 10f is calculated by subtracting the final rear torque command value $T^{}_{mr}$ from the total requested torque $T^*_{mfr}$. The output torque of each of the front motor 10f and the rear motor 10r is controlled based on the final front torque command value $T^{}_{fm}$ and the final rear torque command value $T^{}_{mr}$.

As a result, there is provided a specific calculation mode for realizing a suitable balance between suppression of the change in longitudinal G and maintenance of the responsiveness related to the torque control described above.

Furthermore, in the present embodiment, the driving force control device for executing the driving force control method is provided.

The driving force control device (controller 50) is provided in the vehicle 100, and distributes a requested driving force for traveling driving (total requested torque $T^*_{mfr}$) at a predetermined distribution ratio (distribution ratio κ) according to the traveling state of the vehicle 100 and outputs the requested driving force by the front motor 10f and the rear motor 10r, and the vehicle 100 includes the front motor 10f serving as the first electric motor that drives the front wheels 11f, and the rear motor 10r serving as the second electric motor that drives the rear wheels 11r.

The controller 50 serving as the driving force control device includes: a torque transfer unit (rate limiting unit 56) that transfers the output torque from the rear motor 10r serving as one electric motor to the front motor 10f serving as the other electric motor in response to a change in the distribution ratio γ based on the traveling state of the vehicle 100; a slip state parameter setting unit (slip control unit 54) that sets the slip state parameter (front-rear wheel speed difference $\Delta w_{mfr}$ and slip control intervention flag $f_{FB}$) indicating the slip state of the vehicle 100; and a change speed limiting unit (rate limiting unit 56) that limits the change speed $C_r$ of the transferred torque amount $\Delta T^*_m$.

When the slip state parameter is equal to or smaller than the predetermined threshold value (when the slip control intervention flag $f_{FB}$="0"), the rate limiting unit 56 serving as the change speed limiting unit sets the upper limit of the change speed $C_r$ of the output torque to be transferred (transferred torque amount $\Delta T^*_m$) to the first upper limit value $C_{r\_lim1}$ that is relatively small. Furthermore, when the slip state parameter exceeds the threshold value (when the slip control intervention flag $f_{FB}$="1"), the rate limiting unit 56 sets the upper limit of the change speed $C_r$ of the transferred torque amount $\Delta T^*_m$ to the second upper limit value $C_{r\_lim2}$ that is relatively large.

As a result, the configuration of the control device suitable for executing the driving force control method is realized.

Second Embodiment

Hereinafter, a second embodiment will be described. The same elements as those in the first embodiment are denoted by the same reference numerals, and descriptions thereof will be omitted.

Figure 7:
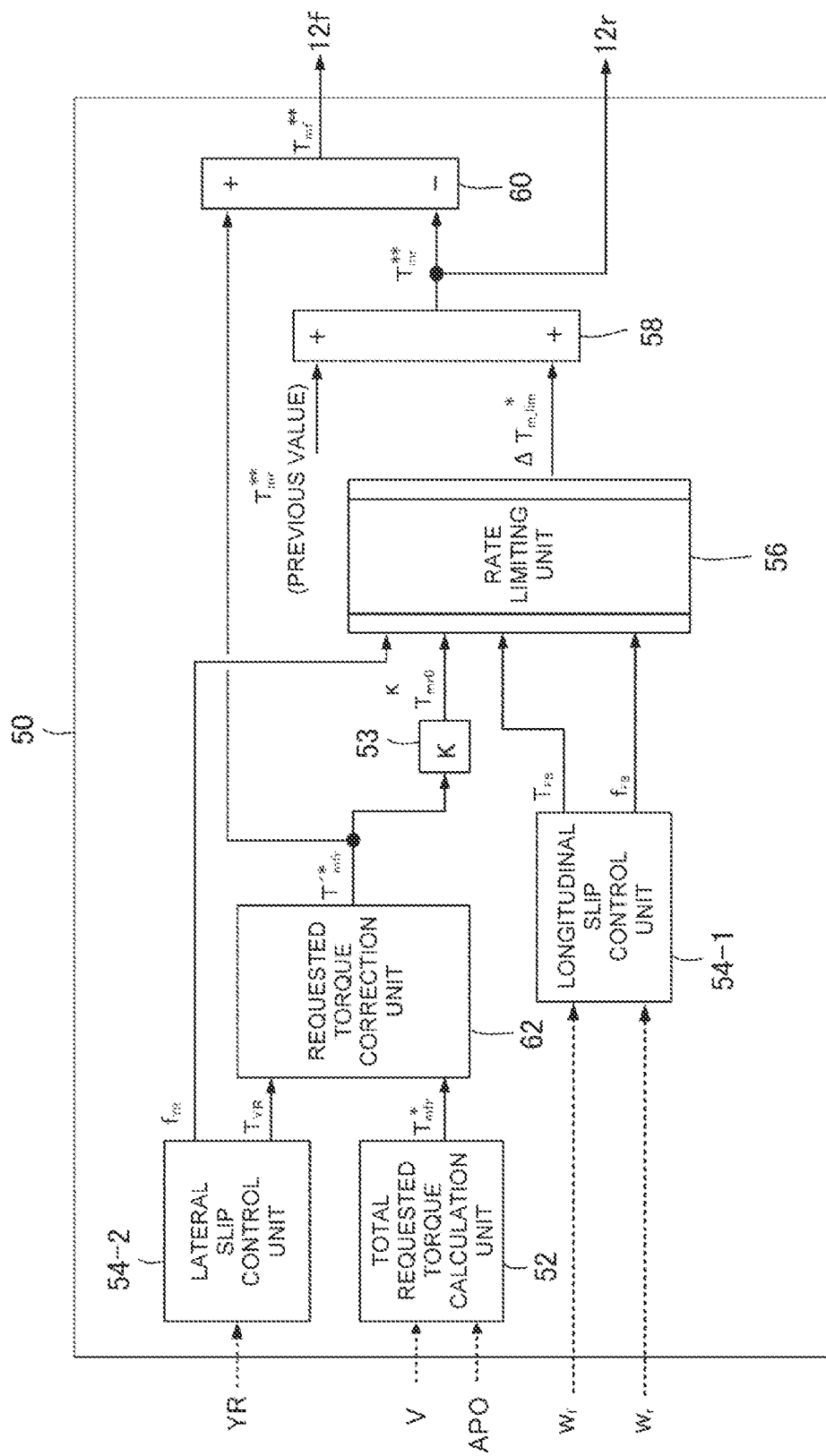
FIG. 7 is a block diagram illustrating a configuration of a driving force control device according to a second embodiment.

FIG. 7 is a block diagram illustrating a configuration of a controller 50 in the present embodiment. As illustrated, in the present embodiment, the slip control unit 54 includes a longitudinal slip control unit 54-1 and a lateral slip control unit 54-2. The longitudinal slip control unit 54-1 performs the same process as that of the slip control unit 54 in the first embodiment. That is, the longitudinal slip control unit 54-1 performs feedback control so as to suppress the slipping of the front wheels 11f or the rear wheels 11r of the vehicle 100.

On the other hand, the lateral slip control unit 54-2 performs control to suppress slipping of the vehicle 100 in a lateral direction (rotation direction about a center of gravity of a vehicle) that may occur, for example, in a scene such as a sharp turn. A yaw rate YR detected by a yaw rate sensor (not shown) is input to the lateral slip control unit 54-2. The lateral slip control unit 54-2 calculates, based on the input yaw rate YR, a correction torque $T_{YR}$ that is determined to eliminate the slipping of the vehicle 100 in the lateral direction.

When the calculated correction torque $T_{YR}$ is equal to or larger than a predetermined threshold value, the lateral slip control unit 54-2 sets a lateral slip control intervention flag $f_{YR}$ to "1". When the calculated correction torque $T_{YR}$ is less than the predetermined threshold value, the lateral slip control unit 54-2 sets the lateral slip control intervention flag $f_{YR}$ to "0". The threshold value to be compared with the correction torque $T_{YR}$ is set to a suitable value from a viewpoint of determining whether the slipping of the vehicle 100 in the lateral direction occurs to such an extent that correction of the total requested torque $T^*_{mfr}$ is substantially necessary. The lateral slip control unit 54-2 outputs the calculated correction torque $T_{YR}$ to a requested torque correction unit 62, and outputs the set lateral slip control intervention flag $f_{YR}$ to the rate limiting unit 56.

The requested torque correction unit 62 receives, as an input, the total requested torque $T^*_{mfr}$ from the total requested torque calculation unit 52 and the correction torque $T_{YR}$ from the lateral slip control unit 54-2, and calculates a corrected total requested torque $T'^*_{mfr}$. The requested torque correction unit 62 outputs the calculated corrected total requested torque $T'^*_{mfr}$ to the torque distribution unit 53. Therefore, in calculation performed by the torque distribution unit 53 and subsequent calculation described in the first embodiment, the corrected total requested torque $T'^*_{mfr}$ is used instead of the total requested torque $T^*_{mfr}$.

In addition to the slip control intervention flag $f_{FB}$, the lateral slip control intervention flag $f_{YR}$ is input to the rate limiting unit 56 as a flag (slip state parameter) indicating the slip state of the vehicle 100. When both the slip control intervention flag $f_{FB}$ and the lateral slip control intervention flag $f_{YR}$ are set to "0" in step S120 shown in FIG. 3, the rate limiting unit 56 executes a process of step S130 and subsequent processes. On the other hand, when at least one of the slip control intervention flag $f_{FB}$ and the lateral slip control intervention flag $f_{YR}$ is set to "1" (when the slipping of the vehicle 100 in either a longitudinal direction or the lateral direction occurs), the rate limiting unit 56 executes a process of step S150 and subsequent processes.

As a result, when the slipping occurs not only in the longitudinal direction but also in the lateral direction of the vehicle 100, the rate limiting unit 56 sets the upper limit of the change speed $C_r$ of the transferred torque amount $\Delta T^*_m$ to the second upper limit value $C_{r\_lim2}$ that is relatively large. Therefore, during occurrence of the slipping of the vehicle 100, regardless of whether the slipping is the slipping in the longitudinal direction or the slipping in the lateral direction, the responsiveness of the torque control can be improved and the slipping can be quickly eliminated by relaxing the limitation on the change speed $C_r$ of the transferred torque amount $\Delta T^*_m$.

Although the embodiments of the present invention have been described above, the above embodiments merely exemplify some of application examples of the present invention and do not intend to limit the technical scope of the present invention to the specific configurations of the above embodiments.

For example, in the above embodiments, an example has been described in which the final rear torque command value $T^{**}_{mr}$ determined by limiting the transferred torque amount $\Delta T^*_m$ by the first upper limit value $C_{r\_lim1}$ or the second upper limit value $C_{r\_lim2}$ is calculated, and the final front torque command value $T^{}_{fm}$ is calculated by subtracting the final rear torque command value $T^{}_{mr}$ from the total requested torque $T^*_{mfr}$. However, the present invention is not limited thereto, and for example, a configuration may be used in which the final front torque command value $T^{**}_{fm}$ determined by limiting the transferred torque amount $\Delta T^*_m$ by the first upper limit value $C_{r\_lim1}$ or the second upper limit value $C_{r\_lim2}$ is calculated, and the final rear torque command value $T^{}_{mr}$ is calculated by subtracting the final front torque command value $T^{}_{fm}$ from the total requested torque $T^*_{mfr}$.

In the above embodiments, an example has been described in which the upper limit of the transferred torque amount $\Delta T^*_m$ is set to the second upper limit value $C_{r\_lim2}$ when the feedback control for eliminating the slip state is executed based on the front-rear wheel speed difference $\Delta w_{mfr}$ (when the slip control intervention flag $f_{FB}$ is set to "1"). On the other hand, a configuration in which a plurality of types of feedback controls for eliminating the slip state are executed (a configuration in which a plurality of different front-rear wheel speed difference threshold values $\Delta w_{mfr\_Th}$ are set, and different feedback controls are executed depending on the front-rear wheel speed difference threshold values $\Delta w_{mfr\_Th}$) may be used, and the second upper limit value $C_{r\_lim2}$ whose value is different depending on a type of each feedback control may be set in a range larger than the first upper limit value $C_{r\_lim1}$.

Furthermore, in the above embodiments, the situation is mainly assumed in which the rear inverter 12*r* has lower responsiveness of communication to the command signal of the controller 50 than the front inverter 12*f*. However, conversely, when the rear inverter 12*r* has lower responsiveness of communication than the front inverter 12*f*, a control configuration described in the above embodiments can also be similarly applied with roles of the front wheel side and the rear wheel side being interchanged.

The invention claimed is:

1. A driving force control method that is executed in a vehicle including a first electric motor configured to drive a front wheel and a second electric motor configured to drive a rear wheel, and that distributes a requested driving force for driving at a predetermined distribution ratio according to a traveling state of the vehicle and outputs the requested driving force by the first electric motor and the second electric motor, the driving force control method comprising:
   calculating a basic torque command value of the first electric motor or the second electric motor based on the requested driving force and the predetermined distribution ratio;
   calculating a slip state parameter indicating a slip state of the vehicle;
   calculating a correction torque determined to eliminate slipping of the vehicle based on the slip state parameter;
   calculating a transferred torque amount based on the basic torque command value and the correction torque, the transferred torque amount being a torque amount to be transferred from the first electric motor to the second electric motor;
   calculating a limited transferred torque amount based on the slip state parameter, the limited transferred torque amount being obtained by limiting a change speed of the transferred torque amount;
when the slip state parameter is equal to or smaller than a predetermined threshold value, setting the limited transferred torque amount to a first upper limit value, wherein the first upper limit value:
increases as the requested driving force increases; and
suppresses a delay in torque control;
when the slip state parameter exceeds the predetermined threshold value, setting the limited transferred torque amount to a second upper limit value, wherein the second upper limit value:
is larger than the first upper limit value; and
suppresses sudden changes in the transferred torque amount while the vehicle is in the slip state
calculating a final front torque command values and a final rear torque command value for the first electric motor and the second electric motor so that a sum of the final front torque command value and the final rear torque command value corresponds to the requested driving force; and
controlling the first electric motor and the second electric motor based on the final front torque command value and the final rear torque command value, wherein:
the final rear torque command value is determined by applying the limited transferred torque amount so that the change speed is adjusted according to whether slipping occurs, and
the final front torque command value is determined from the final rear torque command value such that the change speed of the final front torque command value corresponds to the change speed applied to the final rear torque command value.

2. The driving force control method according to claim 1, further comprising:
when the requested driving force is equal to or smaller than a predetermined driving force threshold value, setting the first upper limit value to a constant value with respect to a change in the requested driving force; and
when the requested driving force exceeds the predetermined driving force threshold value, setting the first upper limit value to a variation value that increases with an increase in the requested driving force.

3. The driving force control method according to claim 1, wherein the slip state parameter includes a front-rear wheel speed difference which is a difference in rotation speed between the front wheel and the rear wheel, and the driving force control method further comprises:
setting a predetermined speed difference threshold value as the predetermined threshold value; and
calculating the correction torque such that the front-rear wheel speed difference approaches the predetermined speed difference threshold value.

4. A driving force control device that is provided in a vehicle including a first electric motor configured to drive a front wheel and a second electric motor configured to drive a rear wheel, and that distributes a requested driving force for driving at a predetermined distribution ratio according to a traveling state of the vehicle and outputs the requested driving force by the first electric motor and the second electric motor, the driving force control device comprising a processor configured to:
calculate a basic torque command value of the first electric motor or the second electric motor based on the requested driving force and the predetermined distribution ratio;
calculate a slip state parameter indicating a slip state of the vehicle;
calculate a correction torque determined to eliminate slipping of the vehicle based on the slip state parameter;
calculate a transferred torque amount based on the basic torque command value and the correction torque, the transferred torque amount being a torque amount to be transferred from the first electric motor to the second electric motor;
calculate a limited transferred torque amount based on the slip state parameter, the limited transferred torque amount being obtained by limiting a change speed of the transferred torque amount;
when the slip state parameter is equal to or smaller than a predetermined threshold value, set the limited transferred torque amount to a first upper limit value, wherein the first upper limit value:
increases as the requested driving force increases; and
suppresses a delay in torque control;
when the slip state parameter exceeds the predetermined threshold value, set the limited transferred torque amount to a second upper limit value, wherein the second upper limit value:
is larger than the first upper limit value; and
suppresses sudden changes in the transferred torque amount while the vehicle is in the slip state
calculate a final front torque command values and a final rear torque command value for the first electric motor and the second electric motor so that a sum of the final front torque command value and the final rear torque command value corresponds to the requested driving force; and
control the first electric motor and the second electric motor based on the final front torque command value and the final rear torque command value, wherein:
the final rear torque command value is determined by applying the limited transferred torque amount so that the change speed is adjusted according to whether slipping occurs, and
the final front torque command value is determined from the final rear torque command value such that the change speed of the final front torque command value corresponds to the change speed applied to the final rear torque command value.

* * * * *